United States Patent [19]

Boggs et al.

[11] 3,929,006

[45] Dec. 30, 1975

[54] MEASURING ARTICLE THICKNESS ULTRASONICALLY

[75] Inventors: Luther Miles Boggs, Chamblee; Howard John Flichman, Atlanta, both of Ga.

[73] Assignee: Western Electric Company, Inc., New York, N.Y.

[22] Filed: Nov. 26, 1973

[21] Appl. No.: 419,170

[52] U.S. Cl............................... 73/67.8 S; 73/67.9
[51] Int. Cl.² .................. G01B 17/02; G01N 29/00
[58] Field of Search............ 73/67.7, 67.8 R, 67.8 S, 73/67.9

[56] References Cited
UNITED STATES PATENTS

| | | | |
|---|---|---|---|
| 3,372,576 | 3/1968 | Dory.................................. | 73/67.9 |
| 3,423,992 | 1/1969 | Dory.................................. | 73/67.9 |
| 3,474,664 | 10/1969 | Mitchell et al...................... | 73/67.9 |
| 3,509,752 | 5/1970 | Moore................................ | 73/67.9 |
| 3,605,504 | 9/1971 | Kummer, Jr. et al............... | 73/67.7 |
| 3,827,287 | 8/1974 | Boggs et al. ...................... | 73/67.8 S |

Primary Examiner—Richard C. Queisser
Assistant Examiner—John P. Beauchamp
Attorney, Agent, or Firm—E. W. Somers

[57] ABSTRACT

In a system for measuring ultrasonically cable jacket thickness, an ultrasonic pulse is transmitted into engagement with the jacket as the cable is advanced through an upstream portion of a cooling trough adjacent an extruder. Signals developed as a result of a sequence of valid associated first and second echo pulses received from surfaces of the cable which define the jacket are processed. The system is provided with the capability of avoiding interference of the testing of a first echo pulse by a closely spaced second echo pulse which occurs in the measurement of thin-walled cable jackets.

The system provides a first signal in response to a determination that the first echo pulse exceeds a predetermined minimum threshold amplitude. A second signal, distinguishable from the first signal, is provided in the event that the first echo pulse does not exceed a time varying threshold amplitude greater than the predetermined minimum threshold value beyond a preset time, and the receipt of a second echo pulse exceeding a predetermined minimum threshold amplitude. Should the second echo pulse then be validated with respect to a predetermined peak amplitude and a duration characteristic, the time interval between the first and second signals is converted into a measurement indicative of jacket thickness.

19 Claims, 3 Drawing Figures

MEASURING ARTICLE THICKNESS ULTRASONICALLY

BACKGROUND OF THE INVENTION

1. Field of the Invention

This invention relates to measuring ultrasonically automatically elongated member and, more particularly, to logic methods of and logic circuitry for measuring ultrasonically the thickness and eccentricity of a thin-walled jacket extruded about a cable core being advanced along a predetermined path.

2. Prior Art and Technical Considerations

One cable structure used in the communications industry includes a metallic moisture barrier which is wrapped longitudinally about a cable core being advanced to form an overlapping seam. Thereafter, a jacket of a plastic material is extruded over the core and the moisture barrier. Then the jacketed cable is passed through a water trough to reduce the temperature of the jacket.

It is desirable to monitor continuously the jacket wall thickness as well as the eccentricity of the jacket. Monitoring of the jacket facilitates the maintenance of a uniform thickness of the jacket along the cable and the conservation of plastic material by applying the minimum acceptable jacket thickness. The monitoring of the eccentricity is of assistance in making adjustments to the extrusion apparatus to allow circular uniformity of the jacket thereby conserving additional material.

Capacitance techniques for measuring the thickness of a plastic jacket extruded over a metallic moisture barrier are well known in the art. See, for example, U.S. Pat. No. 3,500,185 issued on Mar. 10, 1970 in the name of W. T. Eppler. This technique is only satisfactory when the dielectric constant of the plastic is independent of temperature or when a plastic, the dielectric constant of which is not independent of temperature, is maintained accurately at a predetermined temperature. Capacitance measurement techniques are not effective for measuring inner jackets over the core in the absence of a metallic barrier.

Also, it is desirable to monitor the jacket thickness as physically close to the extruder as possible in order to control rapidly the extruder to correct for inadequate or excessive thickness or defective eccentricity. Prior art methods have usually involved contacting type measurement devices which of necessity could not be engaged with the cable jacket until the temperature of the cable jacket has been reduced. By the time such a system monitored and recorded the thickness of opposite wall sections of the cable, the cable had been advanced through an appreciable distance. Moreover wear is experienced with a contacting probe which causes poor readings. This necessitates high maintenance costs.

Pulse echo ultrasonic techniques have been used in the prior art for measuring thickness in solids. A sound wave pulse is generated by a crystal transducer which is also used to pick up the return pulses. The return pulses are processed in a receiver, and the time difference between the return echo from the outer surface and the return echo from the inner surface is a measure of the jacket thickness.

Ultrasonic measurement techniques are shown in U.S. Pat Nos. 3,423,992, 3,509,752, and 3,474,664. But prior art does not show the sophistication to distinguish between the echoes from the different acoustical interfaces nor the ability to distinguish between valid signals and spurious ones in a moving cable being measured.

Apparatus which has been used successfully for measuring automatically ultrasonically cable jacket thickness is disclosed and claimed in application Ser. No. 268,973, filed on July 5, 1972 in the names of L. M. Boggs, H. J. Flichman, J. A. Hudson, Jr., and J. W. Levengood, and in application Ser. No. 268,961, filed on July 5, 1972, now U.S. Pat. No. 3,827,287, in the names of L. M. Boggs, H. J. Flichman, and J. A. Hudson, Jr.

In the aforementioned applications in the name of L. M. Boggs et al, a time period is established during which sequences of valid first and second echo pulses are received and tested. A valid second pulse may not occur until a predetermined time after the beginning of the first pulse. If it were received before, the pulses would interfere with each other.

This apparatus disclosed and claimed in the above-identified applications is the only known apparatus for automatically measuring the thickness of the cable jacket material in and of itself. Other commercially available equipment, for example, measures a distance from the outwardly facing surface of the jacket to a metal shield enclosing the cable core. However, there may be an air gap between the inwardly facing surface of the jacket and the shield which could lead to a deceptive reading. Other apparatus attempting to measure adjacent the extruder use an air gap between the jacket and a probe. This gap is difficult to control in a manufacturing environment of a cable which has lateral and longitudinal movement.

Some difficulty may be experienced in measuring ultrasonically thin-walled cable jackets. The reflected echo pulse from the inwardly facing surface of a thin-walled jacket may be received by logic circuitry prior to the end of the test period for the first pulse. The rapid receipt of the second pulse interferes with the conclusion of the testing of the first echo pulse. The interference occurs because the threshold amplitude is exceeded by a normally valid first echo pulse for a time period which may exceed the time between receipt of the first and second pulses. This could cause the logic circuitry to register an apparent invalid sequence for what is actually a valid sequence of valid pulses.

SUMMARY OF THE INVENTION

Methods and apparatus are provided for controlling the measuring automatically ultrasonically of a thin-walled elongated member. An on signal and an off signal are developed in response to the receipt of a valid sequence of first and second associated echo pulses from one surface and an opposite surface, respectively, which define the thin-walled member. In order to be valid, the first and second echo pulses must have a predetermined sequence of test characteristics. Facilities are provided for avoiding interference of the second reflected echo pulse with the measuring of the first pulse.

More particularly, the thickness of a cable jacket having first and second surfaces bounding a material of known acoustical properties is accomplished by establishing a medium having known acoustical characteristics contiguous with the first surface of the article. A longitudinal wave is generated in the medium directed toward the first surface. One part of the wave is reflected therefrom back through the medium, as a first echo, the other part of the wave passing through the first surface and the cable jacket to the second surface, and a portion of the other part being reflected back through the cable jacket and the medium as a second echo. A quantity proportional to the time interval between a first echo, having a first predetermined minimum intensity and a duration beyond which the intensity is less than a time varying intensity greater than the first predetermined intensity, and a second echo, having a second predetermined minimum intensity and a duration during which the second predetermined minimum intensity is exceeded, is generated to establish the thickness of the cable jacket, while inhibiting the generation of any quantity when either of the predetermined minima or duration characteristics do not exist.

BRIEF DESCRIPTION OF THE DRAWINGS

Other objects and features of the present invention will be more readily understood from the following detailed description of specific embodiments thereof when read in conjunction with the appended drawings, in which.

DETAILED DESCRIPTION

GENERAL OVERALL ARRANGEMENT

Figure 1:
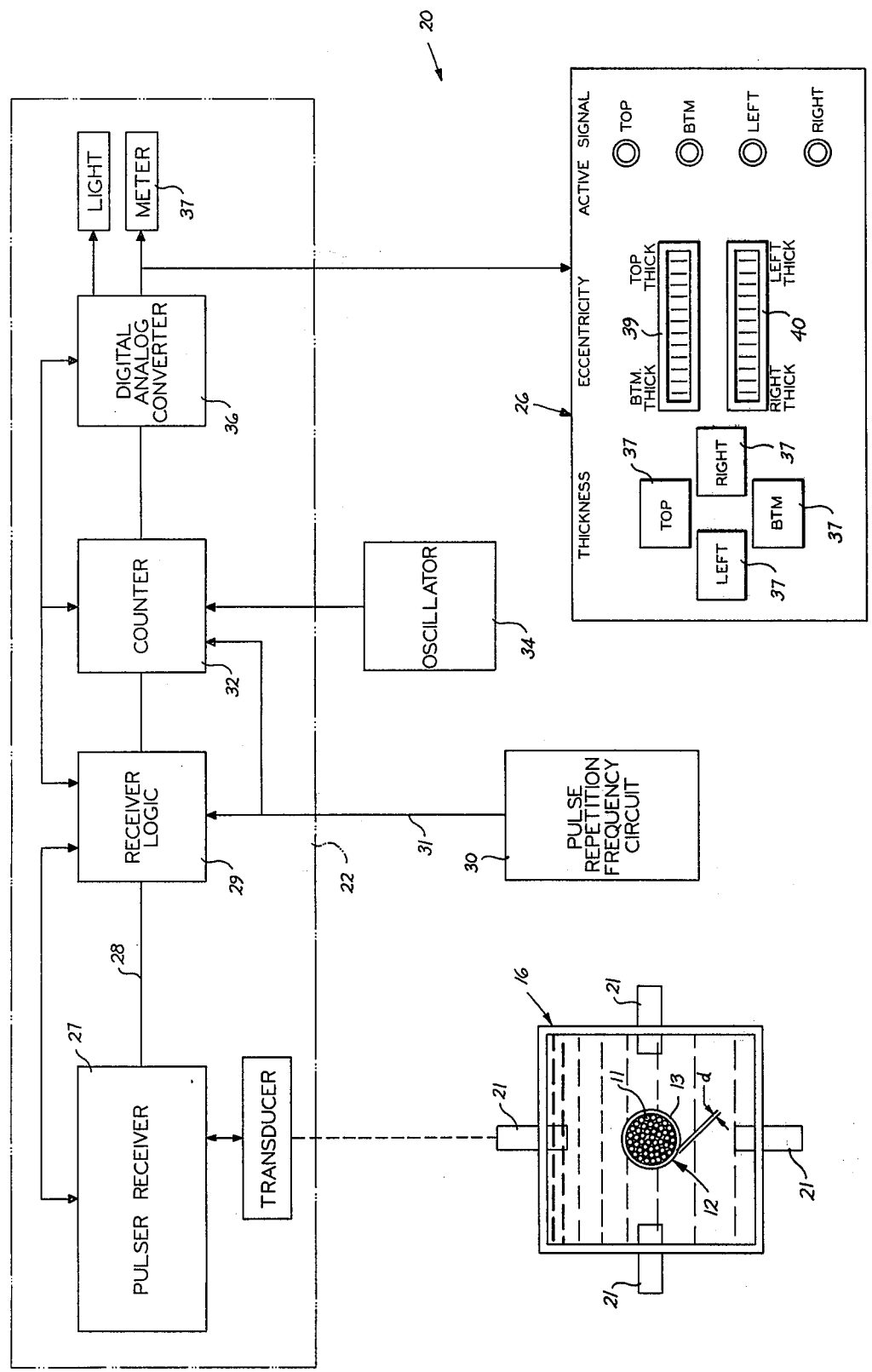
FIG. 1 is a view of an ultrasonic apparatus embodying the features of this invention for measuring the thickness and eccentricity of successive sections of a thin-walled cable jacket.

Referring now to FIG. 1, a cable core 11 covered with a plastic material such as polyethylene to provide a cable 12 having a jacket 13 is advanced into and through a cooling trough 16. In order to most effectively control the thickness "d" of the jacket 13 which is extruded over the core 11 and further to control the eccentricity of the jacket, an ultrasonic jacket measuring apparatus, designated generally by the numeral 20 is used. The apparatus 20 monitors the jacket thickness and eccentricity as the jacketed core 11 is advanced into the water trough 16. The apparatus 20 is non-contacting and measures the jacket thickness at a point along the manufacturing line that minimizes transport lag of feedback to an extruder control system.

The ultrasonic jacket thickness measuring apparatus 20 is designed to use the well-known pulse-echo measuring technique that requires at least one crystal 21 (see FIG. 1) which is excited to emit pulses directed toward the jacketed cable 12. The water of the cooling trough 16 serves as the coupling medium for transmitting ultrasonic energy to the cable jacket 13.

In order to conduct a meaningful monitoring of the thickness "d" of the jacket 13, it becomes necessary to measure the jacket thickness at several points around the periphery thereof. This is also necessary in order to be able to determine the eccentricity of the cable jacket 13.

As can best be seen in FIG. 1, a plurality of crystals 21—21 are deployed about and spaced from the circumference of the jacketed cable 12 with each of the crystals being immersed in the cooling medium, e.g., water, of the cooling trough 16.

The crystals 21—21 are excited by a voltage impulse which causes cylical mechanical stresses. These stresses generate high frequency pressure gradients or waves in the coupling medium, which in this case is the water of the cooling trough 16. The waves, varying in intensity as a damped sinusoid, propagate to the surface of the cable jacket 13 in time T, (see FIG. 3($a$)) where a portion thereof is reflected due to the acoustical impedance mismatch. This causes an outer surface echo (echo pulse I, see FIG. 3($a$)) to be generated and received in time 2T.

A portion of the pressure wave also travels inwardly into the cable jacket 13. A second reflection occurs at the interface of the inwardly facing surface of the cable jacket with the metallic barrier or with the interface of the inwardly facing surface of an inner jacket with the core or with an air gap in time (2T + $t$). This determines the second, or inner surface, echo pulse II (FIG. 3($a$)) which is received in time (2T + 2t).

Figure 3:
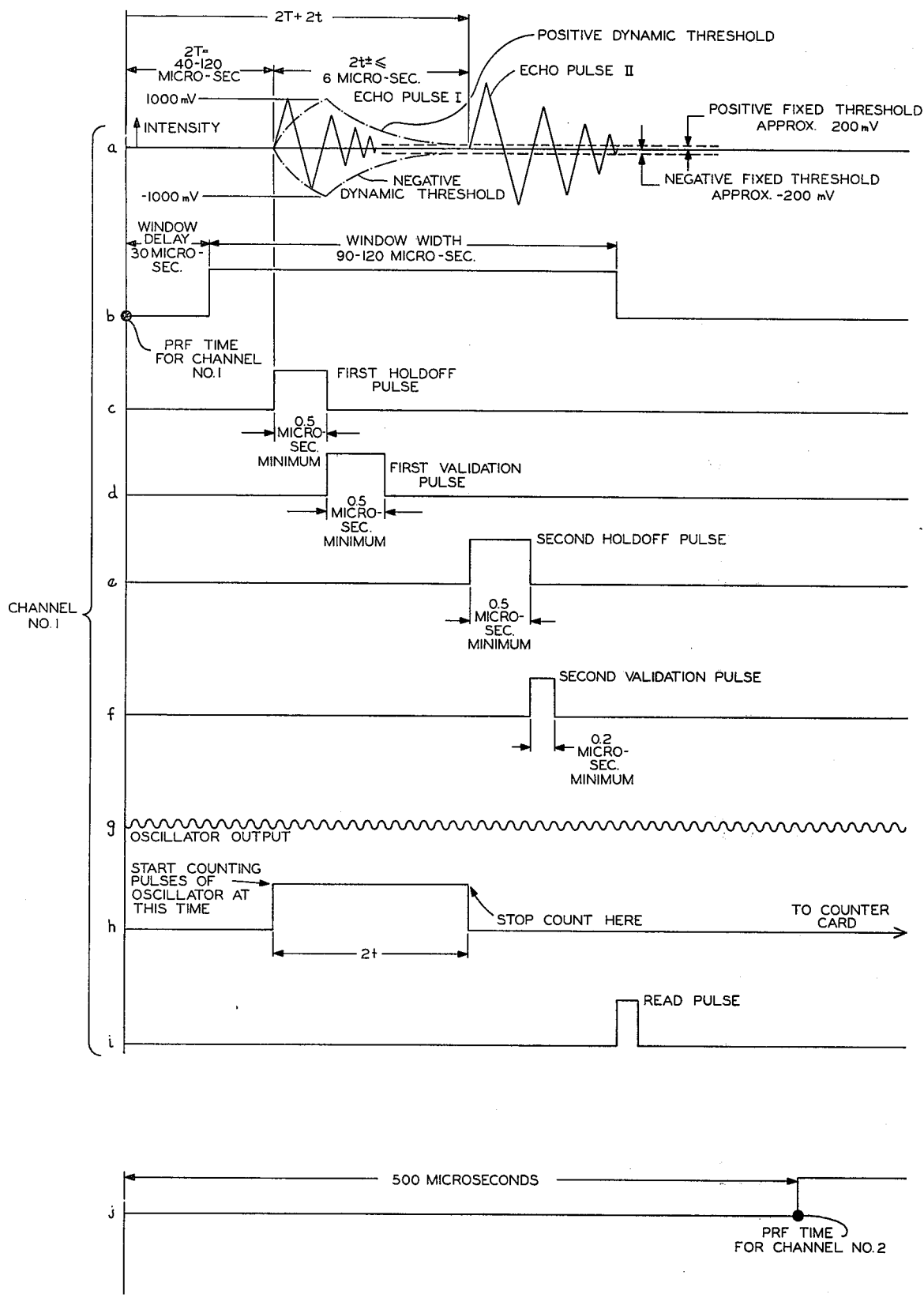
FIG. 3 is a graph showing wave forms associated with the operation of the units of the apparatus shown in FIG. 1 and having appropriate legends for indicating the various curves thereof.

It will be recalled that the measurement technique involved is to determine the time separation (2$t$, see FIG. 3($a$)) between echo signals. This separation relates directly to the thickness "d" of the cable jacket 13. The thickness data depends on the uniformity of the sound velocity in the polyethylene in the water trough.

Each of the crystals 21—21 is connected electrically to an associated one of a plurality of channels 22—22 (see FIG. 1). Each of the channels 22—22 includes a plurality of elements to be described hereinafter for converting the time interval between the pulse echoes received from the various interfaces of the materials aligned with the associated crystal 21 to an output which is proportional to the thickness of the cable jacket 13.

Additionally, other elements are provided, which together with the four channels 22—22 comprise facilities for producing an output. The output, which is in terms of thickness and eccentricity, is displayed for an operator on a console 26 (see FIG. 1).

Referring still to FIG. 1, there is shown a typical one of the channels 22—22 together with other elements which are common to the four channels. Each of the channels 22—22 includes the associated one of the crystals 21—21 which is connected electrically to an associated pulser-receiver, designated generally by the numeral 27. The pulser-receiver is described in herebefore identified application Ser. No. 268,973 filed July 5, 1972.

The pulser-receiver 27 is a specially designed device which is used in each cycle initially to transmit a pulse to the associated one of the crystals 21—21 to cause the associated crystal to ring at the natural frequency thereof. Subsequently, in each one of the cycles, the pulser-receiver 27 functions to receive pulse echoes from the cable 12 under test.

The pulser-receiver 27 is connected electrically along a line 28 to a receiver logic circuit, designated generally by the numeral 29, which upon command from a pulse repetition frequency (PRF) circuit 30, causes the pulser-receiver 27 to pulsed the associated transducer crystal 21. As can be seen in FIG. 1, the pulse repetition frequency circuit 30 is connected along a line 31 to the receiver logic circuit 29.

The receiver logic circuit 29 is designed to validate echo pulses received from the cable 12 under test and is capable of discarding those pulses not pertinent to the measurement of the thickness of the jacket 13. As such, the receiver logic circuit 29 must have the inherent intelligence to discriminate between noise spikes and valid signals as well as to distinguish as between the first and second echo signals.

The receiver logic circuit 29 must also have the capability of determining rapidly the validity or invalidity of the first echo pulse. This will permit the conditioning of the apparatus 20 to look for a second echo pulse shortly after the receipt of the first echo pulse. This facilitates the testing of thin-walled cable jackets 13.

The receiver logic circuit 29 is connected electrically to a counter, designated generally by the numeral 32. The counter 32 is designed to measure the width of the output pulse from the receiver logic circuit 29. The counter 32 is pulsed by a commercially available oscillator, designated generally by the numeral 34, (see oscillator output, FIG. 3(g)) and is designed to store the pulse count in a buffer or memory bank (not shown) provided that the pulses received by the pulser-receiver 27 are validated by the receiver logic circuit 29.

Subsequently, the stored digital count from the counter 32 is transferred to a digital-to-analog converter, designated generally by the numeral 36, which converts the digital count to an analog voltage. The function of the digital-to-analog converter 36 is to provide an analog voltage corresponding to the digital count stored in the counter 32. This voltage is an indication of thickness for the associated channel. The continuous analog voltage, appropriately scaled, is displayed on a meter 37 (see FIG. 1) associated with that channel 22. This permits an operator to monitor continuously the thickness "d" of the cable jacket 13 at a portion of the periphery associated with the one channel.

In the alternative, the counter output stored in the buffer may be connected to a commercially available general purpose digital computer (not shown) so that data analysis and reduction may be accomplished.

In order to measure the eccentricity of the cable jacket 13, and eccentricity measuring circuit (not shown) is connected to the digital-to-analog converter 36 of each one of the channels 22-22. The eccentricity measuring circuit is designed to compare the jacket thickness "d" at the top and bottom of the cable jacket 13 as viewed in FIG. 1, and the jacket thickness at the left and right hand sides thereof. Of course, the comparative measurements need not be taken along horizontal and vertical axes but rather only at opposing intersections of the axes of a coordinate system with the cable jacket 13.

The eccentricity measuring circuit is designed to subtract the thickness of the bottom measurement from the measurement at the top of the jacket 13, as viewed in FIG. 1, with the result being multiplied by 100 and divided by the nominal jacket thickness to yield a percent of nominal jacket thickness. A similar computation is made with respect to the thicknesses at the left and right hand portions of the cable jacket 13. Each of these measurements is displayed on a top-bottom meter 39 and a left-right meter 40 associated with the eccentricity measuring circuit (not shown).

Figure 2:
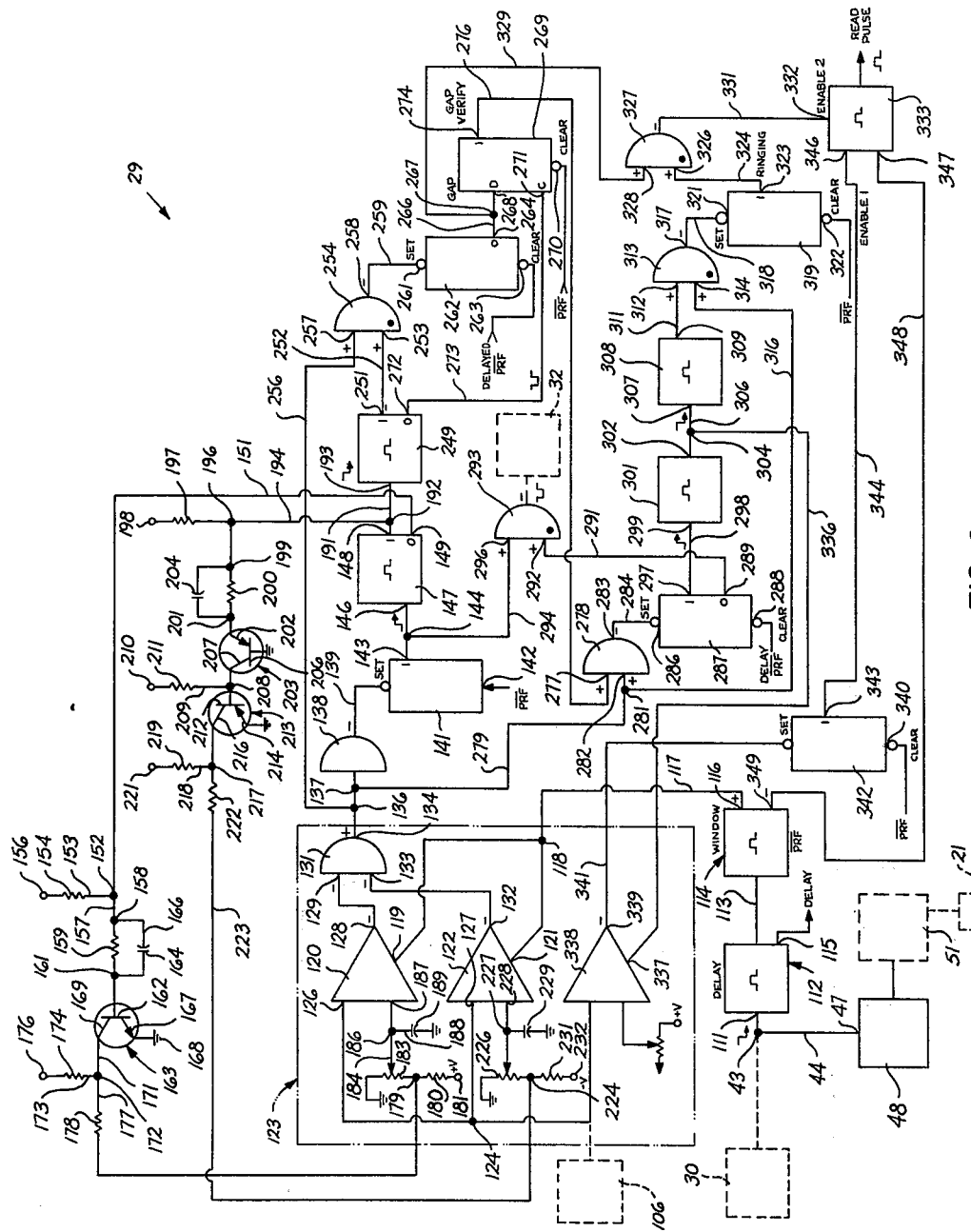
FIG. 2 is a detail schematic view of a receiver-logic circuit shown in FIG. 1 for discriminating among spurious signals and meaningful measurement signals to control the generation of a read pulse for validating a time removal indicative of the jacket thickness and including facilities for comparing the intensity of a first echo pulse of a sequence of first and second echo pulses with a time varying threshold intensity.

The pulse repetition frequency circuit 30 is designed to apply a so-called $\overline{PRF}$ signal (⊥⌐) at a time referred to as the PRF time (see FIG. 3(b)) over the line 31 to a junction point 43 (see FIG. 2), for example, of the first channel and from there to an input 47 of a pulsing device, designated generally by the numeral 48 (see FIG. 2). The pulsing device 48 applies a pulse to the pulser-receiver 27 to control the pulser-receiver to cause the associated transducer 21 to emit pressure waves.

Reference may be made to the hereinbefore identified copending application, Ser. No. 268,973, filed on July 5, 1972 for a more detailed description of the overall apparatus 20. That application also disclosed the pulser-receiver 27 and a receiver logic circuit.

The pulser-receiver 27 includes a triggering circuit, designated generally by the numeral 51 (see FIG. 2), to which is applied the pulse from the pulsing device 48. This causes the application of a current pulse to the circuit 51 to generate pulses to engage the cable jacket 13.

A wide-band, low noise, video amplifier 106 (see FIG. 2) receives, amplifies and then transmits return echo signals from the cable 12 to the logic circuit 29. The low level current return signals must be amplified to approximately a one to three volt level. The wide-band video amplifier is selected so that the semiconducotr devices used therein have low noise properties. In this way, the signals received and amplified for transmittal to the receiver logic circuit 29 will be stronger than the signals caused by noise and hence will permit accurate detection of the meaningful signals.

The provision of facilities in the pulser-receiver 27 for reducing the noise level during a time period when echo pulses are accepted by the apparatus 20 for testing is especially important when using the apparatus 20 to measure the thickness of an inner jacket. The pulse echoes received from the inner jacket are lower in amplitude than those received from an outer jacket. This is caused by the plastic surface being more irregular on the inner jackets. The slight peaks and valleys of the inner jacket reduce the target area of the cable, and, thus, cause less leading edge amplitude of the echo signals. Also, the slight peaks and valleys cause phase differences in portions of the electrical echo signals, which may add out-of-phase giving lower amplitudes. Although echo signal strength does vary between inner and outer jackets and between sizes of cable, a fixed gain system can be employed for all types of a cable having a particular insulation.

The inner jacket shrinks about the cable core 11 and presents a somewhat irregular outwardly facing surface. In contrast, the outer jacket is extruded over a tubular metal shield which assists in causing the outwardly facing surface of the outer jacket to be rather uniform.

Because of the known distance between the transducers 21—21 and the cable 12 together with the velocity of propagation of sound waves in a water medium, the time interval during which pulse echo signals may be expected to generally known. Therefore, the ultrasonic apparatus 20 is designed to accept pulse echo signals during this time interval only, which is referred to hereinafter as the "window width" (see FIG. 2(b)).

The detection system embodying certain principles of this invention is tailored to the characteristics of the expected signals and to a range of cable jacket thicknesses. The capability of measuring thin cable jackets is especially important today with the trend toward thinner jackets to reduce costs. This is also becoming increasingly important as plastics become in short supply.

Experimental data shows that acoustical impedance for polyethylene decreased for higher temperatures such as those experienced in the water trough 16 adjacent the extruder (not shown). In particular, the first echo was much lower in amplitude than the second echo due to the greater acoustical mismatch at the second polyethylene surface. Also, the second echo signal had a much longer duration than the first echo signal. These signal characteristics are used to advantage in the design of the "intelligence" of the receiver logic circuit 29. On inner jacket measurements, where signal amplitudes would vary considerably due to surface irregularities, this "intelligence" is particularly beneficial. If echo amplitude or duration, momentarily drops below minimums, and incorrect measurement is not made. Instead, the last previous good measurement is retained in a register buffering the counter 32 to maintain a correct thickness output.

Moreover, the testing of the first echo pulse must be completed within a shortened time to avoid interference from the associated second pulse reflected from the inner acoustical interface of a thin-walled jacket.

DETAILED DESCRIPTION OF RECEIVER LOGIC CIRCUIT

The receiver logic circuit 29 is designed to check the following expected signal characteristics: (1) the signal echoes occur in a predetermined time span (the so-called "window width") after the transmitted pulse, (2) that a valid first echo is short in time duration compared to the second echo (see FIG. 3(a)), (3) that a valid first echo does not exceed a known variable, i.e., time varying threshold level beyond a preset time, (4) that the peak amplitude of a valid second echo is greater than the minimum required of the first echo (see FIG. 3(a)), and (5) that the valid second echo pulse exceeds a known threshold value beyond a preset time. If these characteristics are met for a particular signal, the receiver logic circuit 29 issues a command in the form of a read pulse to the counter 32 to store a count recorded during the time $2t$ (see FIG. (i)) as valid data.

The output of the PRF circuit 30 is connected through a junction point 43 to an input 111 of a monostable one-shot multivibrator, designated generally by the numeral 112 (see FIG. 2), which generates a delay pulse applied along a line 113 to a second monostable, one-shot multivibrator, designated generally by the numeral 114, and from an output 115 to other elements of the circuit. One output 116 of the multivibrator 114 is connected along a line 117 through a junction point 118 to an input 119 of a positive voltage threshold detector or comparator 120 and an input 121 of a negative voltage comparator 122.

The threshold detectors 120 and 122 are included in a comparator portion 123 of the receiver logic circuit 29. The threshold is a minimum qualifying predetermined amplitude and the detection thereof by the detectors 120 or 122 is useful for purposes of measuring a time interval. The threshold detectors 120 and 122 are set to detect at as low a level as possible, perhaps just above the noise level.

As is seen in FIG. 2, the comparator portion 123 of the circuit 29 includes an RF terminal input 124 which is connected to the wide band video amplifier. The input 124 is applied to inputs 126 and 127 of the threshold detectors 120 and 122, respectively. The detectors 120 and 122 have a negative true output when the thresholds thereof are exceeded.

As can be seen in FIG. 2, an output 128 of the threshold detector 120 is applied to an input 129 of a NOR gate 131, a logic element having negative logic. This nomenclature is interpreted to mean that should either the input 129, or another input 133, have a negative or low level voltage applied thereto, the character of the output is changed over that of the input, i.e., an output 134 of the NOR gate 131 will be a positive or high level. An output 132 of the detector 122 is applied to the other input 133 of the NOR gate 131.

The output 134 of the NOR gate 131 is applied through junction points 136 and 137 to an inverter 138. The inverter changes the polarity of the input signal and then the output is applied along a line 139 to a flip-flop 141, a bistable element, to set the flip-flop.

The flip-flop 141 has a clear or reset input 142 connected to the pulse repetition frequency (PRF) circuit 30 and has one output 143 thereof connected through a junction point 144 to an input 146 of a hold-off pulse generator, designated generally by the numeral 147. The hold-off pulse generator 147, which is a monostable, one-shot multivibrator, is connected from the output 148 to a validation pulse generator, designated generally by the numeral 249. The validation pulse generator 249 is also monostable, one-shot multivibrator.

The function of the hold-off and validation pulse generators 147 and 249, respectively, can best be explained by referring to FIG. 3. A valid first echo pulse must initially exceed the known threshold value and may exceed that value at any time within a preset time referred to as the hold-off time as determined by the first hold-off pulse (see FIG. 3(c)). This qualifies the first echo pulse for further testing. In order to be validated, the first echo pulse must not exceed threshold during a preset time, referred to as validation time, after hold-off, as determined by the first validation pulse (see FIG. 3(d)).

If the first echo pulse is validated, the circuit 29 begins looking for an associated valid second echo pulse. A valid second echo pulse must be such that it exceeds threshold initially and during a preset hold-off time as determined by the second hold-off pulse (see FIG. 3(e)) and at least once during a validation time, as determined by the second validation pulse (see FIG. 3(f)).

Problems occur in measuring thin-walled jackets 13—13. The thickness "$d$" represented by the distance between the beginning of the first and the second echo pulses is such that the distance between pulses is not too great. Moreover, the threshold value is low enough that a relatively long hold-off time must be designed into the circuit 29 to insure that the threshold is not exceeded for the duration of the validation pulse. In thin-wall jackets, e.g., as low as 24 mils, the second echo pulse may be received during the validation pulse, generated by the validation pulse generator 249, prior to the completion of the testing of the first pulse. This would then give the apparent indication that the first echo pulse was still present during the validation pulse time and hence not be a valid first pulse.

In order to avoid this problem, a variable or dynamic threshold value is used (see FIG. 3(a)). The dynamic threshold curve is designed to peak out at the conclusion of the first hold-off pulse and then to decay toward the fixed threshold amplitude shown. It should be observed from FIG. 3(a) that the decaying threshold is still above the priorly used fixed threshold level beyond the first validation pulse time. Compare FIGS. 3(a) and 3(d). The threshold rises to a peak and decays so that echo pulse I fall below the dynamic threshold substantially prior the the conclusion of the priorly used hold-off time and does not exceed the dynamic threshold during the validation time. This permits the use of a substantially shorter hold-off pulse (0.5 microsec.) than was common before (1 to 1.25 microsec.).

As can best be seen in FIG. 2, the multivibrator 147 has an output 148 and an output 149. The output 149 is connected along a line 151 to a junction point 152. The junction point 152 is connected along a line 152 through a resistor 154 to a positive five volt supply terminal 156.

The junction point 152 is also connected along a line 157 to a junction point 158 through a resistor 159, a junction point 161 and to base 162 of an NPN transistor, designated generally by the numeral 163. A speed-up capacitor 164 is connected across the junction points 158 and 161 by a line 166. An emitter 167 of the transistor 163 is connected to a ground 168 while a collector 169 is connected along a line 171 to a junction point 172.

The junction point 172 is connected along a line 173 through a resistor 174 to a positive fifteen volt supply terminal 176. The junction point 172 is also connected along a line 177 through a resistor 178 to a junction point 179 forming part of the threshold circuit 123.

The junction point 179 is connected through a resistor 180 to a positive voltage terminal 181 and also along a line through a potentiometer 183 to ground. An arm 184 of the potentiometer 183 is connected through a junction point 186 to an input 187 of the threshold detector 120. As can be seen in FIG. 2, the junction point 186 is also connected along a line 188 through a capacitor 189 to a ground.

Again referring to FIG. 2, the output 148 of the hold-off multivibrator 147 is connected along a line 191 through a junction point 192 to an input 193 of a multivibrator 249. The junction point 192 is also connected along a line 194 through a junction point 196 and a resistor 197 to a positive five volt supply terminal 198.

The junction point 196 is connected to a junction point 199 and through a resistor 200 and a junction point 201 to an emitter 202 of a PNP transistor, designated generally by the numeral 203. A speed-up capacitor 204 is connected across the junction points 199 and 201.

The transistor 203 includes a base 206 connected to ground and a collector 207, the collector being connected to a junction point 208. The junction point 208 is connected along a line 209 through a resistor 211 to a negative fifteen volt terminal 210.

The junction point 208 is also connected to a base 212 of the second PNP transistor, designated generally by the numeral 213. The transistor 213 includes an emitter 214 connected to ground and a collector 216. The collector is joined through a junction point 217 along a line 218 through a resistor 219 to a negative fifteen volt terminal 221.

Still referring to FIG. 2, the junction point 217 is seen also to be connected to resistor 222 which is connected through a line 223 to a junction point 224 within the comparator portion 123. The junction point 224 is connected to a potentiometer 226 which connects through a junction point 227 to an input 228 of the negative threshold detector 122.

The dynamic negative level of the threshold detector 122 is developed across a capacitor 229. The capacitor 229 is interposed between the junction point 227 and ground and performs the charge and discharge function of the negative threshold detector 122.

Finally, the dynamic threshold modification of the receiver logic circuit 29 includes a resistor 231. The resistor 231 is interposed between the junction point 224 and a negative fifteen volt terminal 232.

The shape of the rise portion of the positive variable threshold curve (see FIG. 3(a)) is determined by the characteristics of the passive components including the resistors 174, 178, 180, 183 and the capacitor 189. During the decay of the curve tending toward the positive fixed threshold value (see horizontal dashed line above x-axis in FIG. 3(a)), the circuit functions to provide a path from the capacitor 189 through a transistor 163 to ground. The configuration of the decay portion of the positive dynamic threshold curve is determined by the passive components including the resistors 178, 180 and 183 and the capacitor 189.

The shape of the rise portion of the negative variable threshold curve (see FIG. 3(a)) is determined by the characteristics of the passive components which include the resistors 219, 222, 226 and 231 and the capacitor 229. During the decay of the curve tending toward the negative fixed threshold value (see horizontal dashed line below x-axis in FIG. 3(a)), the circuit functions to provide a path from the capacitor 229 through the resistor 222 and the transistor 213 to ground. The decay characteristics of the negative dynamic threshold curve are determined by the passive components including the resistors 222, 231, and 226 and by the discharge capacitor 229.

This portion of the logic circuit 29 will provide an indication of the intensity of the first echo pulse as compared to the dynamic threshold curve. Should the intensity of the first echo pulse exceed that of the dynamic threshold curve, during the validation pulse, the NOR gate 131 will be caused to produce an output that is applied as a signal to the junction point 136 and subsequently to a NAND gate 254.

An output 251 of the multivibrator 249 is connected along a line 252 to an input 253 of the positive true NAND gate 254. Also, as can be seen in FIG. 2, the junction point 136 is connected along a line 256 to the other input 257 of the NAND gate 254. Should positive signals be applied simultaneously to the inputs 253 and 257 of the NAND gate, the character of the output changes over that of the input, i.e., a negative or low level appears at an output 258 thereof.

The output 258 of the NAND gate 254 is connected along a line 259 to a set input 261 of a flip-flop 262. The flip-flop 262 is reset by a delayed $\overline{PRF}$ signal. This is caused by the application of a reset signal to an input 263 of the flip-flop by the trailing edge of the delay pulse from the output 115 of the multivibrator 112.

Still referring to FIG. 2, an output 264 of the flip-flop 262 is connected along a line 266 through a junction point 267 to an input 268, referred to as the "D" input, of a flip-flop 269. A clock input, referred to as a "C" input, 271 of the flip-flop 269, is applied from an output 272 of the multivibrator 249 along a line 273.

The flip-flop 269 which is cleared by a pulse repetition frequency signal ($\overline{PRF}$) applied from the PRF circuit 30 to an input 270 produces a signal at an output 274 and transmitted along a line 276 to one input 277 of a positive true NAND gate 278. The junction point 137 is connected along a line 279 through a junction point 281 to a second input 282 of the NAND gate 278. An output 283 of the NAND gate 278 is connected along a line 284 to an input 286 of a flip-flop 287.

The flip-flop 287 has a reset input 288 from the pulse repetition frequency circuit 30 but which is delayed relative to the trailing edge of the pulse generated by the multivibrator 112. One output 289 of the flip-flop 287 is connected along a line 291 to an input 292 of a positive true NAND gate 293. Also, the junction point 144 is connected along a line 294 to another input 296 of the NAND gate 293, the NAND gate producing a negative or low output pulse, as shown in FIG. 2, which is applied to the counter 32. Another output 297 of the flip-flop 287 is connected along a line 298 to an input 299 of a monostable, one-shot multivibrator 301.

The multivibrator 301 functions as a generator of a hold-off pulse for testing the characteristics of the second echo pulse. An output 302 thereof is connected along a line through a junction point 304 and a line 306 to an input 307 of a second echo validation pulse generator, designated generally by the numeral 308. The generator 308 is also a monostable, one-shot multivibrator. An output 309 of the multivibrator 308 is connected along a line 311 to an input 312 of a positive true NAND gate 313 with another input 314 of the NAND gate connected back along a line 316 to the junction point 281.

The NAND gate 313 is adapted to produce a negative signal at an output 317 and then along a line 318 to set a flip-flop 319 through an input 321 thereof. The flip-flop 319 is a so-called ringing flip-flop and has a reset input 322 from the pulse repetition frequency circuit 30. Moreover, the flip-flop 319 is adapted to produce a signal at an output 323, then along a line 324 to an input 326 of a positive true NAND gate 327.

The NAND gate 327 is adapted upon application of positive or high signals at both of the inputs 326 and an input 328 connected along a line 329 to the junction point 267 to produce a negative or low level along a line 331 to an input 332 of a control or read pulse generator in the form of a monostable, one-shot multivibrator 333 to enable the multivibrator.

In order to test the peak amplitude of the second echo pulse, the junction point 304 on the output side of the multivibrator 301 is connected along a line 336 to an input 337 of an amplitude comparator 338 of the detector circuit 123. An output 339 of the comparator 338 is connected along a line 341 to a flip-flop 342. The flip-flop 342 also has a reset input 340 from the pulse repetition frequency sequencer 30. An output 343 from the flip-flop 342 is connected along a line 344 to an input 346 of the multivibrator 333 to enable the multivibrator.

Moreover, the multivibrator 333 is arranged and cooperates with other ones of the elements of the circuit 29 such that at the end of the "window-width", the multivibrator will, upon command, generate the read pulse. This causes the count to be stored in the counter memory bank (not shown). In order to look for a command at the end of the "window-width", the multivibrator 333 has another input 347 thereof connected along a line 348 back to an output 349 of the multivibrator 114.

It should be realized that the term "measure" or "test" or "monitor" as used herein is interpreted to mean the comparison of a quantity to a reference quantity. For example, the threshold detectors 120 and 122 check to determine if the echo pulses are initially exceeding the minimum threshold amplitude. On the other hand, the comparator 338 determines whether the peak amplitude of the second echo pulse is greater than a predetermined magnitude. Of course, the apparatus 20 could be sophisticated so that the actual values of the time durations and the amplitudes could be determined.

The preferred embodiment described herein records a time count between the echo pulses if a sequence of first and second echo pulses is validated. The first pulse is validated if the amplitude is above a certain minimum threshold and does not exceed a variable threshold value beyond a preset duration. The second pulse is validated if the peak amplitude thereof is in excess of a preset magnitude and the duration at which threshold is exceeded is greater than a preset duration. A valid sequence of associated first and second echoes must occur in the so-called window width.

The present invention also contemplates that not only may the actual values of pulse amplitude and duration be determined, but also the frequency content of the echo pulses for comparison to those associated with particular material of the jacket under test.

The term "facing" as employed in the specification and claims appended thereto when referring to the relationship between a surface and an object will be understood to mean that the surface is oriented in the direction of the object and may be, but is not necessarily, adjacent to or in contact with the object.

All of the logic elements, i.e., the NAND gates and the NOR gate, the bistable elements, i.e., the flip-flops and the monostable elements, i.e., the one-shot multivibrators are described in operation in terms of positive logic where a high or positive level voltage represents or exhibits a binary "1" and a low or zero level voltage represents a "0". Also, generally throughout the method of generation, the inputs and outputs of the various elements are described in terms of high or low levels. It is understood that this is to be interpreted in accordance with the description hereinbefore.

A positive true NAND gate (a negative true NOR gate) produces a low level output only when a high level input is present on all inputs thereof. The output is a high level for any other combination of inputs.

A negative true NOR gate (a positive true NAND gate) produces a high level output when there is a low level present on any input. Only when there is no input of a low level is there a low level output.

A flip-flop refers to a bistable multivibrator or similar circuit or device having two stable states. The flip-flop may have a plurality of inputs for being switched from one state to the other state with the application of an input thereto. Additionally, the flip-flop conventionally has two outputs, only one of which need be used. A high level or "1" output produces a low output voltage level and a "0" output produces a high output voltage level when the flip-flop is in a first reset or clear state.

The output voltage levels are reversed when the flip-flop is set to a second state.

A one-shot multivibrator refers to a monostable multivibrator or similar circuit or device which upon application of a "1" to the input thereof, the input going from "0" to "1" or low to high, produces a single output pulse of "1" level having a selected duration. This occurs in the "1" output. Simultaneously, a negative or low level pulse of the same duration occurs on the "0" output.

An inverter refers to a device which produces a "0" output when a "1" is applied to the input thereof, and conversely, which produces a "1" output when a "0" is applied to the input thereof.

It should be observed that the application of the $\overline{PRF}$ signal to the reset or clear inputs of any of the conventional flip-flops resets the flip-flops. The resetting of the flip-flops causes the "1" output terminals to exhibit a low level. The resetting likewise causes "0" outputs to become high.

Operation of Apparatus

In describing the method of operation of the apparatus 20 in accordance with the principles of this invention, reference will be made to FIGS. 1, 2 and 3. The pulse repetition frequency circuit 30 applies a pulse along the line 31 to the junction point 43 and then along the line 44 to the pulsing device 48. Then, the pulsing device 48 applies a triggering pulse to the triggering circuit 51.

The triggering circuit 51 causes a pulse to be applied to one of the transducers 21—21 to cause the transducer to generate pressure waves which engage with the sections of the aligned jacketed cable 12.

The receiver logic circuit 29 is designed to test the validity of echo pulses received in accordance with predetermined test characteristics determined at least in part by the composition of the jacket 13 under test.

The receiver logic circuit 29 is designed to yield a positive-going pulse should the echo pulses received by the pulser-receiver 27 be within a predetermined amplitude range. The receiver logic circuit 29 includes logic circuitry for making outside and inside band determinations for the echo pulses. Should the amplitude of the echo pulses received by the pulser-receiver 27 be in excess of a predetermined amplitude, the circuit will register a negative or outside band pulse.

A valid set of echo pulses received by the pulser-receiver 27 are spaced a time 2t apart as shown in FIG. 3(h) with the first echo pulse, designated I, occuring approximately 40–120 microseconds after the initiation of the cycle. The first echo pulse occurs when the pulse emitted by the associated ringing transducer crystal 21 engages the outwardly facing surface of the jacket 13. The second echo pulse, designated II, occurs when the unreflected portion of the pulse emitted by the transducer 21 crystal strikes the inwardly facing surface of the jacket 13.

The amplitude of echo pulse I is a function of the acoustical impedance mismatch between the hot polyethylene jacket and the water in the cooling trough 16. The amplitude of the echo pulse II is a function of the acoustical impedance mismatch between the hot polyethylene jacket and the core 11. Moreover, for polyethylene jackets, the first echo pulse is lower in amplitude and duration than the second echo pulse.

During the "window-width" (of approximately 90–120 microsecond duration, see FIG. 3(b)), a hold-off pulse (see FIG. 3(c)) is generated by the receiver logic circuit 29 upon receiving a first echo with a validation pulse (see FIG. 3(d)) beginning immediately after the first hold-off pulse ends. It is desirable that the first validation pulse occur during the amplitude decay of the first echo pulse.

Thereafter, at the beginning of the second echo pulse, a second hold-off pulse (see FIG. 3(e)) is generated with a second validation pulse (see FIG. 3(f)) beginning at the conclusion of the seond hold-off pulse. The second validation pulse should occur, during the decay of the second echo pulse.

If the receiver logic circuit 29 indicates a positive or high output 258, then it is known that a valid first echo pulse has been received from the cable being measured. It should be observed that if the receiver logic circuit 29 receives a negative output at the output 258 from an apparent first echo, the receiver logic circuit does not look for a second echo and hence does not generate a read pulse for the first cycle. The portion of the circuitry associated with the second validation pulse should give a negative signal at the output 317 which is indicative of the second echo pulse being outside of the predetermined limits of the threshold band.

The validation pulse also avoids the false pickup of noise signals which may be due to air bubbles in the water medium of the cooling trough 16. If a noise signal precedes the first echo pulse, the circuit picks up the noise signal as a first echo and subsequently attempts to validate the true first echo as an apparent second echo. Should this occur, the receiver logic circuit 29, not receiving the expected positive-negative sequence, manifested as outputs 258 and 317 respectively, does not cause the read pulse to be generated.

Additionally, the pulse repetition frequency circuit 30 controls the operation of the channels 22—22 and the interaction thereof. In order to accomplish this, the pulse repetition frequency circuit 30 generates four pulse repetition rate signals, one for each of the channels 22—22, each with approximately a 2 millisecond period. The four pulses are staggered by approximately 500 microseconds (see FIG. 3(j)), thereby causing the staggering of the operating sequence of the four channels. In this way, the measurement cycle begins with the top channel 22, proceeding to the right, then bottom, then the left channels. All significant activity in the top channel occurs within the first 500 microseconds prior to the generation of the shifted pulse associated with the right channel. This maximizes the time between the operation of opposite ones of the crystals.

The pulse repetition frequency circuit 30 conditions the logic circuit 29 for each cycle of operation. A pulse (a $\overline{PRF}$ pulse defined as a negative true pulse) from the PRF circuit is applied to the high level or "1" inputs 142, 270, 322 and 340 of the flip-flops 141, 269, 319 and 342, respectively, to reset or clear those outputs to a low or "0" level. The application of the $\overline{PRF}$ pulse to those inputs is regarded as the beginning of a test cycle.

The pulse repetition frequency circuit 30 also controls the receiver logic circuit 29 to accept echo pulses only during the predetermined time interval referred to as the window width (see FIG. 3(b)). The pulse from the PRF circuit 30 is applied to the input junction 111 of the monostable one-shot multivibrator 112.

The multivibrator 112 causes a delay (see FIG. 3(b)) of a predetermined duration. The delay pulse is applied to the reset input 263 of the flip-flop 262 to cause the "0" or low level output 264 thereof to exhibit a high level. Also, the delay pulse is applied to a reset input 288 of the flip-flop 287 to cause the high level output 297 to assume a low level and the low level output 289 to assume a high level.

The trailing end of the delay pulse applied over the line 113 to the multivibrator 114 causes the multivibrator 114 to generate a window-width pulse (see FIG. 3(b)). The so-called "window-width" of the window pulse is the time interval in which the channel 22 will receive valid pulse echoes from those emitted to the cable 12 from the associated one of the transducers 21—21 and hence avoid stray pulses. The end of the window pulse is regarded as the end of a test cycle. At that time the receiver logic circuit 29 is caused to make a decision as to whether or not to generate a pulse for further controlling the processing of measurements attributed to receipt of echo signals.

The window pulse is transmitted from the output 116 over a line 117 and applied to the junction point 118. The application of the signal from the window pulse generation portion of the circuit 29 to the junction point 118 enables the threshold detectors 120 and 122.

The threshold detection circuit 123 includes facilities for detecting a positive or a negative echo pulse return signal as applied by the wide-band video amplifier 106 to the input terminal 124. It should be observed from FIG. 2, that only when the window signal appears at the junction point 118 are the pair of threshold amplitude detectors 120 and 122 enabled.

The threshold amplitude detector 120 is designed to apply a negative assertion signal to the input 129 of the NOR gate 131 in response to the application of a valid positive echo pulse to the input terminal 124 of the threshold detection circuit 123. On the other hand, the threshold amplitude detector 122 is designed to also apply a negative assertion signal to an input 133 of the NOR gate 131 in response to a valid negative echo pulse.

The threshold detection circuit 123 is designed to apply a signal to the NOR gate 131 only when the first echo pulse exceeds a predetermined threshold value. An echo pulse greater than the predetermined amplitude is said to be outside band and causes one of the amplitude detectors 120 or 122 to generate a negative signal. If the amplitude is not at least the predetermined amplitude, the amplitude is said to be inside band and the negative signal does not appear.

As the polyethylene jacket 13 cools, the amplitude of a pulse echo from the jacket increases. The present system is designed for measurement of thickness and eccentricity as close to the extruder as possible. Hence, the measurement herein will be that of hot polyethylene material. The detectors 120 and 122 are selected and adjusted to detect pulses that are only of a predetermined minimum magnitude which corresponds to that expected at the outwardly facing surface of the polyethylene jacket 13.

Subsequently, the receiver logic circuit 29 tests the first echo pulse to determine if the first echo pulse is such that the amplitude exceeds the dynamic threshold value only during a time period not greater than a predetermined duration. Experiments have shown that the first pulse to be expected from the interface of the water and the outwardly facing surface of the polyethylene is of a very short duration, e.g., on the order of ½ microsecond. Contrasted to this, the second pulse echo from the interface of the inwardly facing surface of the polyethylene and the core or the shielding layer is of a duration on the order of 1–2 microseconds. This is due to the polyethylene tending to filter out high frequency energy and the greater reflection at the second interface. Hence, any signals to be valid must meet criteria established with respect to both time duration and amplitude.

Should the amplitude of the first echo pulse exceed the predetermined threshold value, the threshold detector 120 or 122 applies a signal to the input terminal 129 or 133, respectively, of the NOR gate 131. This in turn causes output 134 of the NOR gate 131 to exhibit a high level and to apply the positive or high voltage level signal through the junction points 136 and 137 into the inverter 138. The inverter 138 then applies a negative signal over the line 139 to the flip-flop 141. This sets the output 143 of the flip-flop 141 to a high level voltage to cause a high level to appear at the junction point 144.

The flip-flop 141 may only be cleared by the application of the $\overline{PRF}$ signal at the beginning of the subsequent measurement cycle.

The high voltage level at the junction point 144 is applied as a true input to the input 296 of the NAND gate 293. As is seen in FIG. 2, the delay $\overline{PRF}$ pulse applied to the input 288 of the flip-flop 287 at the beginning of each cycle of operation resets the output 289 to a high level thus causing a positive true to appear at the input 292 of the NAND gate 293. This causes the NAND gate 293 to generate negative output pulse which signifies the beginning of the measurement cycle and causes the counter 32 to begin counting.

The reason for the application of a delay $\overline{PRF}$ pulse to the input 288 deserves a word of explanation. Should there be a high level at the output 143 of the flip-flop 141 and a $\overline{PRF}$ pulse applied to the inputs 142 of the flip-flop 141 and 288 of the flip-flop 287, the flipflop 287 may respond more quickly than the flip-flop 141 with positive trues then appearing at both inputs 296 and 292 of the NAND gate 293. But then when the flip-flop 141 is reset, the output 143 assumes a low level which would cause a low level at the output 296 thereby discontinuing the pulse output of the NAND gate 293 and hence the oscillator pulse count. This would cause an erroneous negative output pulse of short duration output from the NAND gate 293 during reset time.

To avoid this, a delay $\overline{PRF}$ pulse is applied to the input 288 of the flip-flop 287. This delays the reset of the output 289 to a high level to not apply a high level at the input 292 of the NAND gate 293 until after the reset of the output 143 of the flip-flop 141 has occurred and the essential setting thereof by at least a partially valid first echo pulse.

The appearance of a high level at the junction point 144 indicates at least a partially valid first echo. A check is initiated to verify this assumption by determining that the duration thereof is approximately 500 nanoseconds and that a time interval or gap occurs thereafter when no signal is present. To this end, the high level at the junction point 144 also causes a high level to be applied to the input 146 of the first hold-off pulse multivibrator 147. The signal at the junction point 144 indicates the presence of a valid pulse echo insofar as amplitude is concerned as determined by one of the threshold detectors 120 or 122.

The application of a signal to the junction point 144 causes the hold-off multivibrator 147 to generate a time delay or hold-off pulse (see FIG. 3(c)) to determine if the duration test characteristic is such as to validate the first echo pulse. The hold-off pulse multivibrator 147 is designed to generate a hold-off pulse of a predetermined time length which in this situation is about 500 nanoseconds. This contrasts with the hold-off pulse of approximately one microsecond which has been used with fixed threshold values.

The output 149 of the multivibrator 147 is normally high and the NPN transistor 163 is normally turned on with the collector 169 near ground potential. If the first echo pulse exceeds the introductory threshold level, as indicated by the horizontal dashed lines in FIG. 3(a), the gate 131 is operated. This causes the flip-flop 141 to operate the multivibrator 147 and the output 149 goes low. The transistor 163 is turned off and current is permitted to flow from the source 176 through the resistor 174 and the resistor 178, the potentimeter 183 to the junction point 186. The current flows from the junction point along the line 188 to the capacitor 189 and raises the voltage thereacross. This voltage is connected to the input 187 of the threshold detector 120 to cause the threshold value of the detector to rise gradually from a quiescent value of approximately 200 mV. along the curve shown in FIG. 3(a) to a peak value of approximately 1000 mV.

The speed-up capacitor 164 is designed to permit a rapid turn-on and turn-off of the transistor 163. The capacitor 164 creates a low impedance-to-ground and permits sufficient current to flow into the transistor at turn-ontime to achieve a rapid turn-on. Prior to turning off the transistor 163, the capacitor 189 is charged. This serves to remove the base-emitter charge during turn-on to facilitate the rapid turn-on.

Simultaneously, with the output 149 of the multivibrator 147 going low, at the leading edge of the hold-off pulse, the output 148, which is normally low, goes high. The normally turned-off transistor 203 draws base current and is turned on. The turn on of the transistor 203 cuts off the base current of another PNP transistor 213, which is normally turned on and hence turns off that transistor.

The transistor 213 has a function with respect to the negative threshold detector 122 similar to that of the transistor 163 with respect to the positive threshold detector 120. When the transistor 213 is turned off, a negative threshold voltage is caused to increase negatively by the −15V source 221 to cause the flow of current from the junction point 224 from ground. The transistor 213, it should be observed, functions as a voltage controlled current switch which is controlled by the output 148 of the multivibrator 147.

The current flows from ground through the capacitor 229 to the junction point 227. This causes the capacitor 229 to become charged negatively and the threshold value of the detector to rise gradually from a quiescent value of approximately −200 mV. along the lowermost curve in FIG. 3(a) to a peak value of approximately −1000 mV.

As can best be seen in FIG. 3(a), this causes the generation of a rise portion of both a positive and a negative threshold curve of variable intensity. The rise of both the positive and the negative variable threshold curves occurs during the hold-off pulse generated by the multivibrator 147. It is generally probable that the intensity or amplitude of the first echo pulse will exceed the intensity of the variable threshold curve during duration of the first hold-off pulse.

The next portion of the test is directed toward the intensity of the first echo pulse during the duration of the pulse generated by the validation pulse generator 249. In order that a qualifying first echo pulse be validated, the intensity thereof must not exceed the variable threshold curve during the duration of the validation pulse.

At the trailing edge of the hold-off pulse, which coincides with peak of the dynamic threshold curve, (see FIG. 3(a)) the output 149 of the multivibrator 147 goes high, and the transistor 163 is turned back on. Current is caused to flow from the capacitor 189, which discharges along the line 177 through the resistor 178 and the transistor 163 to ground. This corresponds to the positive dynamic threshold curve decaying back toward the quiescent threshold value of approximately 200 mV.

When the output 148 goes low at the conclusion of the hold-off pulse, the transistor 203 is turned off, with base current for the transistor 213 flowing through a resistor 211 to turn on the transistor 213. The current path to the junction point 224 is terminated. Then the resistor 222 becomes part of a network of resistors that tends to discharge the capacitor 229 through the resistor 226 to ground and back along the line 223 through the emitter 214 to ground. This corresponds to the dynamic threshold curve decaying back toward the quiescent threshold of approximately −200 mV. (see FIG. 3(a)). It will be recalled, for example, that the passive components — the resistors 222, 226 and 231 and the capacitor 229, are selected to shape the decay of the positive dynamic threshold curve so that a valid first echo pulse will not exceed the curve intensity during the validation pulse duration. It should be observed from FIG. 3(a) that the dynamic threshold curve has not reached the fixed threshold value by the end of the validation pulse duration.

At the conclusion of the hold-off pulse, the trailing edge of the hold-off pulse causes the validation pulse multivibrator 249 to generate a pulse (see FIG. 3(d)) of approximately 500 nanoseconds duration. During this time, the pulse causes a high level to appear at the input 253 of the NAND gate. The next portion of operation is directed toward the duration test characteristic of the first echo pulse. It will be recalled that a valid first echo pulse is such that the amplitude thereof may exceed the amplitude of the dynamic threshold curve only during the hold-off pulse and cannot exceed that dynamic curve amplitude during the validation pulse duration. Should the echo pulse exceed the threshold amplitude at any time during the validation pulse time, the NOR gate 131 produces a high level at the output 134 and the junction point 136 which is applied over the line 256 to the input 257 of the NAND gate 254. This causes an assertion of both positive true inputs of the NAND gate and cause a low level to appear at the output 258 thereof.

If the echo pulse exceeds the decaying threshold value after the hold-off pulse and during the validation pulse, which would indicate that a valid first echo pulse has not been received because of excessive time duration, the measurement of signal is discarded; if not, the signal is further processed and measured.

The output 264 of the flip-flop 262 is reset or cleared to a high level by the delayed $\overline{PRF}$ pulse as applied to the input 263. If the NAND gate is operated to have a low level at the output 258 indicative of an echo pulse exceeding threshold after hold-off, the flip-flop 262 is set by the low level at the input 261 thereof to cause a low level at the output 264 thereof. The low level at the output 264 appears at the junction point 267 and at the so-called "D" input 268 of the flip-flop 269.

If the "D" input of the flip-flop 269 is a low level when the clock or "C" input 271 occurs, which is at the positive trailing edge of the validation pulse generated by the multivibrator 249, the output 274 appears low. This corresponds to a no-gap situation, i.e., the first echo pulse is not a valid one. If the output 274 appears low, the NAND gate 278 is not operated and the output 274 remains low. The next $\overline{PRF}$ pulse tends to reset the flip-flop 269. However, since the flip-flop output 274 is already low, the output remains low.

On the other hand, if the amplitude of the first echo pulse does not exceed dynamic threshold level beyond the hold-off pulse (which indicates a valid first echo pulse), a high does not appear at the input 257 of the NAND gate 254. Consequently, the NAND gate 254 is not operated and does not set the flip-flop 262 and the high at the output 264 appears at the "D" input 268 of the flip-flop 269. Since "D" is high when the clock "C" occurs at the input 271, the output 274 is high thereby causing a high at the input 277 of the gate 278 to enable the gate. The output 274 remains high until the next cycle of operation when the $\overline{PRF}$ pulse resets the flip-flop 269 and causes the output to exhibit a low level.

Should a high occur at the input 277 of the gate 278, the circuit 29 has in effect validated the first echo pulse as to time and duration. This permits the remainder of the circuit 29 to begin looking for a second echo pulse.

The high appearing at the junction point 267 causes a high at the input 328 of the NAND gate 327 to enable the gate. The enabling of the NAND gate 327 is such that if the associated second pulse received is validated as to duration and threshold amplitude, the NAND gate facilitates the generation of a read pulse to cause the count in the counter 32 to be retained.

When the second echo pulse is received by the input 124 of the circuit 29, one of the threshold detectors 120 or 122 functions as described hereinbefore to cause the NAND gate to generate a high at the output 134 thereof. This causes a high to be applied over the line 279 and through the junction point 281 to the input 282 of the already enabled NAND gate 278 to operate the NAND gate.

The operation of the NAND gate 278 (which is due in part to the receipt of the second echo pulse) causes a low level at the output 283 to appear at the input 286 of the flip-flop 287 to set the flip-flop. This conditions the receiver logic circuit 29 to look at the second echo pulse. Also, this indicates the end of the counting cycle (see FIG. 3). The setting of the flip-floop 287 causes a low at the output 289 and hence a low level to appear at the input 292 of the NAND gate 293 to disable the NAND gate and discontinue the production of a low at the output thereof. This causes a discontinuance of the count of the oscillator output by the counter 32 (see FIG. 3(h)).

The remainder of the cycle is devoted to determining the validity of the second echo which would cause the count to be transferred to the buffer (not shown). A validation process is used for the second echo pulse similar to that used to validate the first echo pulse. It will be remembered that the second echo pulse will have a duration on the order of magnitude of ½-2 microseconds. Hence, the portion of the receiver logic circuit 29 which examines the second pulse is constructed with a built-in hold-off typically of one microsecond. Only then is the pulse examined, and if there is yet threshold amplitude, the pulse is validated.

The setting of the flip-flop 287 causes the low at the output 297 to go high and be applied along the line 298. The rising edge of the pulse from the flip-flop 287 causes the second hold-off pulse generator 301 to generate a pulse having a duration of approximately 1.0 microsecond.

When the hold-off delay pulse is generated by the multivibrator 301, a signal is sent from the junction point 304 along the line 336 to an input 337 of the amplitude comparator 338 to enable that comparator. The positive amplitude of the seond pulse is checked by the amplitude comparator 338 to determine if the amplitude of the second echo exceeds a preset value which is much greater than that of the initial threshold. The amplitude comparator 338, as shown in FIG. 2, checks only positive signals; however, it is within the scope of this invention to include another comparator in the circuit 123 for testing the signal for negative excursions.

In the event that the maximum amplitude of the comparator is exceeded, the comparator 338 applies a low level along the line 341 to an input of the flip-flop 342 to set the flip-flop and cause a high level to appear at the output 343 thereof. The high level at the output 343 is applied along the line 344 to apply the signal to the input 346 of the multivibrator 333 to enable the multivibrator.

The trailing edge of the pulse generated by the multivibrator 301 appears at the multivibrator 308 and causes the second pulse validation multivibrator 308 to generate a validation pulse (see FIG. 3(f)) of approximately 500 nanoseconds. The second validation pulse multivibrator 308 causes a high to be transmitted from the output 309 along a path 311 and applied to the input 312 of the NAND gate 313.

Also, as is seen in FIG. 2, if either the positive or negative threshold is exceeded during the duration of the validation pulse, a signal is applied from the junction point 137 along the line 279 to the junction point 281 and then along the line 316 and applied as a high to the input 314 of the NAND gate 313. The threshold testing of the second echo pulse is necessary in order to determine if there is in fact an excursion.

It should also be observed that the dynamic or variable threshold value is necessary primarily during the testing of the first echo pulse of associated first and second echo pulses. The threshold value used in testing the second echo pulse is approximately of constant value for normal thicknesses.

Should highs be applied to the input 314 from one of the threshold detectors 120 or 122 indicating the second pulse echo is present, and to the input 312 from the multivibrator 308, a low level appears at the output 317 to set the flip-flop 319. The setting of the flip-flop 319 causes a high level to appear over the line 324 and at the input 326 of the NAND gate 327 which had been enabled previously.

The NAND gate 327 is operated and then applies a low over the line 331 to the one-shot multivibrator 333 which is designed to generate the read pulse and which had been enabled previously by the amplitude validation.

The generation of a low level pulse by the NAND gate 327 and applied to the multivibrator 333 (see FIG.

2) indicates that the first pulse was less than one microsecond duration with an appropriate gap to the second echo pulse and that the second echo pulse was of ½–2 microseconds in duration.

Upon cessation of the window pulse, a decision is made as to whether or not to generate the read pulse. The cessation of the window pulse is indicated by a signal applied by the one-shot monostable multivibrator 114 over the line 348 to the input 347 of the multivibrator 333. The multivibrator 333 previously enabled by an input 346 from the multivibrator 342 now has an input applied thereto from the NAND gate 327. The multivibrator is now operated to instruct the counter 32 to record the pulse width from the NAND gate 293 upon receiving the trailing edge of the window pulse at the input 347.

The oscillator 34 generates pulses which are counted by the counter 32 beginning at the initiation point on the first hold-off pulse and ending at the initiation of the second hold-off pulse with the difference therebetween being a measure of the time interval between the pulse echoes. If appropriate pulses are generated at 258 and 317 with respect to associated echo pulse pairs in a positive-negative sequence, then a read pulse is generated at the conclusion of the window-pulse. This causes the count stored in the register of the counter 32 to be transferred from the counting portion of the counter into the memory of the counter. Then the count from the memory is applied to the digital-to-analog converter 36 to direct the digital-to-analog converter to provide a continuous voltage output indicative of the jacket thickness.

It should be noted that the previous count stored in the buffer is not updated until the next subsequent valid read pulse is generated to transfer the associated count to the buffer. The circuitry is designed so that a previous count is held in the buffer until the next valid count is received and is not discarded if an invalid count is made.

Of course, it must be understood that it is within the scope of this invention to measure the thickness between a first surface and a second surface spaced from and opposite to the first surface with several layers of differing materials therebetween. Also, instead of measuring a cable jacket thickness, the methods and apparatus would be used to measure the thickness of successive sections of a covering layer enclosing successive sections of a solid core or a hollow core as in tubing.

It should be noted that in some cable structures where, for example, an inner jacket, is in engagement with a core wrap or other material that the second echo pulse of each associated echo pulse pair is stretched out. However, it will be remembered that the development of the off signal by the NAND gate 293 occurs upon receipt of the initial portion of the second echo pulse for purposes of thickness measurement. Also, of course, the peak magnitude and duration characteristics of the second echo pulse will be satisfied. On the other hand, if the core wrap is spaced from the inwardly facing surface of the jacket, the air acts as an open switch through which there is substantially no transmission. Again, the testing and use of the second echo pulse in the thickness measurement is not impaired.

It is to be understood that the above-described arrangements are simply illustrative of the principles of the invention. Other arrangements may be devised by those skilled in the art which will embody the principles of the invention and fall within the spirit and scope thereof.

What is claimed is:

1. A method of measuring the thickness of an article having first and second surfaces bounding a material of known acoustical properties, which comprises the steps of:

establishing a medium having known acoustical characteristics contiguous with the first surface of the article;

generating a longitudinal wave in the medium directed toward the first surface, one part of the wave being reflected therefrom back through the medium, as a first echo, the other part of the wave passing through the first surface and the article to the second survace, and a portion of the other part being reflected back through the article and the medium as a second echo;

generating control signals to establish first and second predetermined minimum intensity levels and a time varying intensity associated with and greater than the first predetermined minimum intensity;

comparing the intensity of a first echo having the first predetermined minimum intensity level with the time varying intensity after a preset time and the intensity of a second echo with the second predetermined minimum intensity;

generating a quantity proportional to the time interval between a first echo having the first predetermined minimum intensity and of which the intensity is less than the time varying intensity after the preset time and a second echo having the second predetermined minimum intensity and a duration during which the second predetermined minimum intensity is exceeded to establish the thickness of the article; and inhibiting the generation of any quantity when at least one of the predetermined minima or time varying intensity characteristics do not exist.

2. A method of measuring ultrasonically the thickness of an elongated member in which an on signal and an off signal are developed in response to the receipt of a predetermined sequence of first and second associated echo pulses of predetermined test characteristics from one surface and an opposite surface, respectively, of the member and in which relative motion is caused to occur between the successive sections of the elongated member and a source of ultrasonic pulses, which includes the steps of:

establishing a test period during which echo pulses are tested;

transmitting an ultrasonic pulse into the member and then receiving a first echo pulse reflected from the one surface of the member and then receiving an associated second echo pulse from an opposite surface of the member; while excluding extraneous low level signals;

testing the first echo pulse and then an associated second echo pulse for a qualifying predetermined minimum amplitude;

initiating in response to receiving a qualifying first echo pulse the development of an on signal and the examination of a validating duration characteristic of the first echo pulse, a valid duration characteristic being a pulse having an amplitude which does not exceed a time varying amplitude greater than the predetermined minimum amplitude beyond a preset time;

conditioning partially in response to the first echo pulse being validated facilities for enabling the generation of a control pulse;

initiating in response to the validation of the first each pulse and the receipt of a qualifying associated second echo pulse the examination of validating test characteristics of a qualifying associated second echo pulse; while causing the development of an off signal distinguishable from the on signal upon the validation of the first echo pulse and the receipt of a second echo pulse of a qualifying predetermined minimum amplitude from the opposite surface of the jacket with the second pulse occurring a predetermined time interval following the beginning of the first pulse, the time duration between the on signal and the off signal being related to the elapsed time between the receipt of the first echo pulse from the one surface and the receipt of the associated second echo pulse from the opposite surface;

measuring the elapsed time between the on signal and the off signal;

completing the conditioning of the enabling facilities in response to validating the associated second echo pulse to generate the control pulse; and converting the measured elapsed time in response to the generation of the control pulse into a signal, the magnitude of which is proportional to the thickness of the elongated member.

3. The method of claim 2, wherein the test characteristic for completing the validation of the associated second echo pulse includes a peak amplitude in excess of a preset value and an amplitude which exceeds the qualifying minimum amplitude during a preset time.

4. The method of claim 2, wherein the elongated member is a cable jacket and the surfaces thereof defining the thickness of the jacket.

5. The method of claim 4, wherein the transmitting of ultrasonic pulses includes the exciting of a transducer immersed in a coupling medium and spaced from the cable.

6. The method of claim 5, wherein a pair of transducers are positioned in alignment with diametrically opposed points on the cable jacket, wherein the transducers are pulsed cyclically sequentially and which also includes the step of:

determining the eccentricity of the jacket jacket by processing the thickness measurements of the jacket at diametrically opposed points.

7. A method of discriminating among pulses received from a sensor to indicate the receipt of a sequence of valid associated pulses, which includes the steps of:

permitting after a predetermined delay the testing of pulses within a predetermined time interval;

enabling the testing of a threshold amplitude of a first pulse upon the receipt thereof;

developing an on signal upon receipt of a first pulse having the threshold amplitude; while further comparing the amplitude of the first pulse with respect to a time varying parameter subsequent to a first preset time;

the threshold amplitude and an amplitude less than the time varying amplitude after the preset time being indicative of a valid first pulse; then developing an off signal in response to the validation of the first pulse and the receipt of an associated second pulse having the threshold amplitude; and then measuring a relationship between the on signal and the off signal;

enabling the testing of the threshold amplitude of the second pulse after a second preset time; while further testing the second pulse for the validity thereof with respect to the peak amplitude thereof;

the validation of the first pulse and the validity of the second pulse with respect to exceeding the threshold amplitude beyond the second preset time enabling a control pulse generator;

the validation of the second pulse with respect to the peak amplitude thereof further enabling the generator;

the enabled generator being operated at the end of the predetermined time interval for causing the measured relationship to be converted into the measurement of another parameter as an indication of the receipt of a sequence of valid associated first and second pulses.

8. A method of determining the validity of each successive sequence of associated first and second echo pulses reflected from surfaces subjected to ultrasonic waves, a valid first pulse having a predetermined minimum amplitude and an amplitude which does not exceed a variable amplitude beyond a preset duration and a valid second pulse having a predetermined minimum amplitude which is also exceeded for a duration greater than a preset time and of generating a control pulse for valid sequences of associated echo pulses, which includes the steps of:

applying the first echo pulse and then the associated second echo pulse as inputs to a logic circuit;

testing the minimum amplitude level of the first echo pulses and then the second echo pulse compared to the validity level;

developing an on signal for a counter upon determining that the first echo pulse has the required level to cause the counter to begin counting;

causing a first echo pulse having the predetermined minimum amplitude to generate a control pulse to delay the examination of the existence of the first echo pulse after the preset value;

determining whether a first echo pulse exceeds a time varying amplitude after the preset value, a valid first echo pulse not exceeding the variable amplitude beyond the present time;

developing an off signal for the counter to discontinue the count upon validating the first echo pulse and receiving a qualifying second echo pulse;

enabling a verification circuit for an associated second echo pulse subsequent to validating a first echo pulse;

causing the enabled second echo pulse verification circuit to generate a holdoff and a validation pulse during the receipt of a second echo pulse;

testing the peak amplitude of the second echo pulse; while determining the presence of the second echo pulse at the predetermined minimum amplitude following the holdoff pulse of the preset time;

enabling the device should the first pulse be valid and the second echo pulse exceed the minimum amplitude during a time greater than the preset time; and further enabling the device for generating the control pulse should the peak amplitude of the second pulse be validated.

9. An apparatus for measuring the thickness of an article having first and second surfaces bounding a material of known acoustical properties, which comprises:

means for establishing a medium having known acoustical characteristics contiguous with the first surface of the article;

means for generating a longitudinal wave in the medium directed toward the first surface, one part of the wave being reflected therefrom back through the medium, as a first echo, the other part of the wave passing through the first surface and the article to the second surface, and a portion of the other part being reflected back through the article and the medium as a second echo;

means for generating control signals to establish first and second predetermined minimum intensity levels and a time varying intensity associated with and greater than the first predetermined minimum intensity;

means for establishing a first preset time associated with the first minimum intensity level and the time varying intensity and a second preset time associated with the second minimum intensity level;

means responsive to the control signals for generating a quantity proportional to the time interval between the first echo having the first predetermined minimum intensity and of which the intensity is less than the time varying intensity after the first preset time and a second echo which exceeds the second predetermined minimum intensity during the second preset time to establish the thickness of the article; and the first echo pulse with a time varying amplitude after the first preset time;

means responsive to the validation of the first echo pulse as one having the qualifying predetermined minimum amplitude and not exceeding the time varying amplitude after the first preset time and the receipt of a qualifying associated second echo pulse for initiating the examination of validating test characteristics of a qualifying associated second echo pulse, means for causing the development of an off signal distinguishable from the on signal with the time duration between the on signal and the off signal being related to the elapsed time between the receipt of the first echo pulse from the one surface and the receipt of the associated second echo pulse from the opposite surface;

means for measuring the elapsed time between the on signal and the off signal;

means for generating a pulse to control the disposition of the measured elapsed time;

means responsive to the first echo pulse being validated for enabling partially the means for generating a control pulse;

means responsive to validating the associated second echo pulse for completing the enabling of the pulse generating means to cause the generating means to generate the control pulse; and means responsive to the generation of a control pulse for converting the measured elapsed time into a signal the amplitude of which is proportional to the means for developing an on signal upon receipt of a first pulse having the required amplitude and an off signal upon validation of the first pulse and during the receipt of a second pulse, a predetermined relationship of the on signal and the off signal being related to a parameter to be measured;

means for measuring the relationship between the on signal and the off signal;

means for causing the measurement to be further processed;

first logic means responsive to receipt of a first pulse having the required amplitude for initiating the developing means and the first pulse duration testing means;

second logic means responsive to a valid first pulse, a valid first pulse exceeding a required minimum threshold amplitude characteristic and not exceeding the time varying amplitude characteristic beyond a preset duration, and a valid associated second pulse, a valid second pulse having a required amplitude characteristic occurring at least within a preset duration, for enabling the causing means;

third logic means responsive to the validation of a first pulse and to the receipt of a second pulse of required minimum amplitude for enabling the second logic means, for developing the off signal and for operating the second pulse peak amplitude verification means;

the validation of the second pulse with respect to peak amplitude further enabling the causing means; and means beginning a test cycle for operating the causing means when the causing means is enabled at the end of the test cycle and for conditioning the circuit for another cycle of operation.

16. An apparatus for measuring ultrasonically the thickness of a cable jacket, which includes:

means for cyclically transmitting ultrasonic pulses into engagement with the outwardly and the inwardly facing surfaces of the cable jacket;

means for receiving a first echo pulse reflected from the outwardly facing surface and an associated second echo pulse from the inwardly facing surface;

first comparator means capable of testing pulses of either polarity for testing an amplitude characteristic of the first echo pulse and responsive to a valid first echo pulse for testing an amplitude characteristic of the second echo pulse, a valid first echo pulse having a predetermined minimum amplitude at threshold, and subsequently exceeding a time varying threshold greater than the predetermined minimum only within a preset duration, a valid second echo pulse having a minimum amplitude at threshold, the minimum amplitude also occurring within a duration in excess of a preset time, and a peak amplitude greater than a predetermined value;

logic means when operated for developing an on signal and responsive to being disabled for developing an off signal with the time duration between the on signal and the off signal being related to the elapsed time between the transmission of a pulse into the outwardly facing surface of the jacket and receipt of a corresponding echo pulse at the outwardly facing surface after reflection from the inwardly facing surface;

means for measuring the time between the on signal and the off signal;

a monostable device which when operated causes the time between the on signal and the off signal to be recorded;

means delayed a predetermined time for enabling the comparator means and for enabling the monostable device;

means connected to the first comparator means and rendered effective by the receipt of a first echo pulse having a required predetermined minimum amplitude at threshold for causing the generation of an amplitude of time varying intensity and for causing the first comparator means to compare the amplitude of the first echo pulse with the time varying amplitude to validate a duration characteristic of the first echo pulse by determining that the varying intensity is not exceeded beyond a preset time;

means interposed between the first comparator means and the first echo pulse validating means and responsive to the receipt of a first echo pulse having the required minimum amplitude for operating the first echo pulse echo validating means and for causing the developing means to develop the on signal;

means for validating a duration characteristic of the second echo pulse;

second comparator means for testing the peak amplitude of the second echo pulse during the testing of a duration characteristic thereof;

switching means connected to the first pulse duration test means and the second pulse duration test means and rendered effective by the validation of the first echo pulse and by the receipt of the second echo pulse spaced from the first for operating the second pulse validation means while causing the logic means to develop the off signal and responsive to an invalid first pulse for inhibiting the operation of the second pulse duration test;

the means for validating the duration of the second echo pulse causing the second comparator means to be operated;

switching means rendered effective by the validation of the first echo pulse and the second echo pulse having at least the predetermined duration test characteristic for further enabling the monostable device;

the validation of the peak amplitude of the second pulse still further enabling the monostable device to operate the monostable device and cause the count to be stored; and sequence control means for causing the transmitting means to operate and for conditioning the apparatus for each successive cycle of operation.

17. An electrical logic circuit for developing an on signal and an off signal with the measured time duration between the on signal and the off signal being related to the elapsed time between the receipt of a valid first echo pulse reflected from a first surface and defined as exceeding a predetermined threshold value and having an amplitude not exceeding a variable threshold beyond a preset time, and the receipt of a valid second echo pulse reflected from a second surface, spaced from the first surface, and defined as having at least a predetermined peak amplitude and a preset threshold value which is exceeded within another preset time duration, and for causing the measured time duration associated with a valid sequence of valid first and second pulses to be processed, which includes:

- a first comparator for amplitude detection of pulses of either polarity exceeding a predetermined level;
- a second comparator for determining if the peak amplitude of the second echo pulse is greater than a predetermined value;
- the comparators having an input signal applied thereto in response to the receipt of the echo pulses;
- means operated after a predetermined delay for enabling the comparators;
- a first bistable element normally in a first state;
- first echo pulse verification means connected to the first bistable element for determining the validity of the first pulse with respect to a duration characteristic and that the end of the first echo pulse is spaced from the beginning of the second echo pulse;
- first logic means connected to the first bistable element and responsive to like signals being impressed on the inputs thereof for developing the on signal and responsive to the disabling thereof for developing the off signal;
- means for enabling the first logic means after the delay;
- second logic means interposed between the first comparator and the first bistable element and responsive to an echo pulse having the required threshold amplitude impressed upon the input of the first comparator for causing the first bistable element to assume a second state to operate the enabled first logic means and cause the first echo pulse verification means to be operated;
- means connected to the first echo pulse verification means and to the first comparator and responsive to the operation of the first echo pulse verification means for causing the comparator to compare the amplitude of the first echo pulse with a time varying amplitude level after a preset time;
- third logic means connected to the output of the second logic means associated with the first comparator and connected to the first echo pulse verification means;
- second echo pulse verification means for validating the associated second echo pulse with respect to the threshold amplitude thereof being exceeded during the other preset time, the second echo pulse verification means being effective during the other preset time for enabling the second comparator to test the peak amplitude of the second echo pulse;
- means for causing the time interval to be processed;
- means connected to the third logic means and the second echo pulse verification means and operated upon the inputs thereof being impressed simultaneously with like signals caused by a valid first pulse and a second pulse exceeding the predetermined threshold level within a preset duration and connected to the causing means for enabling the causing means, a first echo pulse which exceeds the time varying amplitude level after the preset time causing the second logic means to apply a signal to the third logic means such that the enabling means connected to the third logic means does not enable the causing means, further, a second echo pulse which does not exceed the predetermined level after another preset time causing the second pulse verification means to apply a signal to the enabling means connected thereto such that the causing means is not enabled;
- a second bistable element connected to the developing means interposed between the third logic means and the second echo pulse verification means and when in a second state for causing the developing means to develop the off signal and for operating the second echo pulse verification means; and
- a third bistable element interposed between the second comparator and the causing means and responsive to being set to a second state for further enabling the initially enabled causing means to cause the time interval to be converted into a measurement of the distance between the two surfaces, the third bistable element being set to a second state by the second comparator receiving a second echo pulse having a peak amplitude greater than the preset value;
- the causing means being operated by the comparator enabling means after a predetermined time greater than the combined duration of the first and second echo pulses plus the separation therebetween.

18. A circuit for measuring ultrasonically the thickness of a jacket of a cable being advanced along a predetermined path with a transducer being spaced from the cable and at least partially immersed in a coupling medium, which includes:

- means initiating a cycle of operation for causing the transducer to emit ultrasonic waves into engagement with the outwardly facing surface of the cable jacket whereupon successive first echo pulses are reflected, portions of the ultrasonic waves being propagated through the jacket and upon engagement with the interface of the inwardly facing surface causing successive associated second echo pulses to be reflected;
- a first comparator for determining if threshold amplitude of successive ones of the associated pairs of first and second echo pulses exceeds a predetermined minimum level;
- a second comparator for determining if the peak amplitude of the successive ones of the second echo pulses is at least a predetermined value;
- a first monostable multivibrator which when operated generates a pulse having a predetermined time interval during which a valid sequence of first and second echo pulses may occur, the first multivibrator being connected to the first comparator such that the generation of the pulse having the predetermined time interval enables the first comparator;
- a second monostable multivibrator interposed between the cycle initiation means and the first multivibrator for delaying the generation of the pulse having the predetermined time interval;
- a third monostable multivibrator responsive to the validation of a sequence of associated first and second echo pulses for generating a control pulse;
- a valid first pulse exceeding the predetermined minimum amplitude and an amplitude not exceeding a time varying amplitude greater than the minimum amplitude beyond one preset time;
- a valid second pulse having at least a predetermined peak amplitude and exceeding the minimum threshold amplitude within another preset time;

a first logic element connected to the first comparator and operated by a signal impressed thereon by the first comparator in response to receiving a first echo pulse exceeding the required minimum amplitude level;

a first echo pulse verification circuit connected to the output of the first logic element for generating a holdoff pulse of the one preset time;

means connected to the first echo pulse verification circuit and to the first comparator and responsive to the trailing edge of the holdoff pulse for generating a time varying amplitude level, a first echo pulse which exceeds the time varying level beyond the one preset time causing the first logic element to be operated;

a second logic element connected to the first logic element for developing an on signal and an off signal with the time duration between the on signal and the off signal being related to the elapsed time between the receipt of a first echo from the outwardly facing surface of the cable jacket and the receipt of an associated second echo pulse from an opposite surface of the material;

means for measuring the time between the on signal and the off signal, the second logic element being operated when the first logic element is operated for developing an on signal to control the measuring means to begin counting; a third logic element having inputs connected to the first logic element and to the first echo pulse verification circuit and being enabled by the first echo pulse verification means, the third logic element caused to be operated when the first logic element is being operated subsequent to the holdoff pulse;

a fourth logic element having inputs connected to the first logic element and to the first echo pulse verification circuit;

a second echo pulse verification circuit connected to the fourth logic element and connected to the second comparator for impressing a signal thereon to enable the second comparator;

a first bistable device switched in response to the third logic element being operated for discontinuing the operation of the circuit because of the extended duration of the first echo pulse, and switched responsive to the third logic element being in an unoperated state for conditioning the fourth logic element;

a fifth logic element interposed between the bistable means and the third monostable multivibrator and connected to the second echo pulse verification circuit, the fifth logic element being conditioned by the bistable device when switched responsive to the third logic element being unoperated;

the fourth logic element responsive to the first logic element being operated for impressing a signal on the second verification circuit and on the developing means to cause the developing means to develop an off signal to discontinue the count, the count corresponding to the time between the pulses and related to the jacket thickness;

the impression of the signal on the input of the second verification circuit causing the generation of a holdoff pulse of the other preset time;

a second bistable device normally in a first state interposed between and connected to the second comparator and to the third monostable multivibrator;

the enabled second comparator operated by a second echo pulse of the required peak amplitude causing the second bistable device to assume a second state, the switching of the second bistable device to the second state causing a signal to be impressed on the third multivibrator to enable the third multivibrator;

a sixth logic element connected to the second verification circuit and to the first logic element, the sixth logic element operated by the simultaneous impression of like signals from the second verification circuit and from the output of the first logic element to establish that the second pulse exceeds the minimum amplitude during a time interval in excess of the other preset time, the operation of the sixth logic element causing the enabled fifth logic element to be operated, the operation of the fifth logic element further enabling the third multivibrator;

the trailing edge of the pulse having the predetermined time interval operating the enabled third monostable multivibrator to cause the third monostable multivibrator to generate the control pulse which causes the count to be converted to a measurement of thickness; and a pulse repetition sequencer for cyclically operating the initiating means and for resetting the elements of the circuit to condition the circuit for further cycles of operation.

19. An apparatus for measuring the thickness of an article having first and second surfaces bounding a material of known acoustical properties, which comprises:

means for generating a longitudinal wave in a medium having known acoustical chracteristics contiguous with the first surface of the article, the wave being directed toward the first surface, one part of the wave being reflected therefrom back through the medium as a first echo, the other part of the wave passing through the first surface and the article to the second surface, and a portion of the other part being reflected back through the article and the medium as a second echo;

means for generating control signals to establish first and second predetermined minimum intensity levels and a time varying intensity associated with a greater than the first predetermined minimum intensity;

means for generating a quantity proportional to the time interval between a first echo having the first predetermined minimum intensity and a duration beyond which the intensity is less than the time varying intensity greater than the first predetermined intensity and a second echo having the second predetermined minimum intensity and a duration during which the second predetermined minimum intensity is exceeded to establish the thickness of the article; and means for inhibiting the generation of any quantity when either of the predetermined minima or duration characteristics do not exist.

* * * * *

UNITED STATES PATENT OFFICE
CERTIFICATE OF CORRECTION

Patent No. 3,929,006  Dated December 30, 1975

Inventor(s) L. M. BOGGS and H. J. FLICHMAN,

It is certified that error appears in the above-identified patent and that said Letters Patent are hereby corrected as shown below:

In the specification, Column 1, line 8 "Member" should read --members--.
Column 3, line 32 "removal" should read --interval--; Column 4, line 68 "pulsed" should read --pulse--; Column 6, line 16 "disclosed" should read --discloses--; Column 7, line 22 "and" should read --an--; Column 7, line 41 following "varying" insert --,--; Column 7, line 49 following "FIG." insert --3--; Column 8, line 34 following "also" insert --a--; Column 9, line 12 "fall" should read --falls--; Column 9, line 21 second occurrence of "152" should read --153--; Column 9, line 46 delete "a"; Column 10, line 26 second occurrence of "a" should read --the--.
Column 16, line 29 following "generate" insert --a--.
Column 19, line 54 "flop-floop" should read --flip-flop--; Column 22, line 16 "survace" should read --surface--.
Column 24, line 46 "present" should read --preset--; Column 25, line 26 the first occurrence of "the" should read --a--; Column 26, line 10 "," should read --;--.
Column 32, line 50 "a", second occurrence, should read -- and --.

Signed and Sealed this

Twenty-eighth Day of December 1976

[SEAL]

Attest:

RUTH C. MASON
Attesting Officer

C. MARSHALL DANN
Commissioner of Patents and Trademarks